H. J. HOLMES.
LANTERN HOLDER FOR VEHICLES.
APPLICATION FILED NOV. 23, 1910.
984,563.
Patented Feb. 21, 1911.
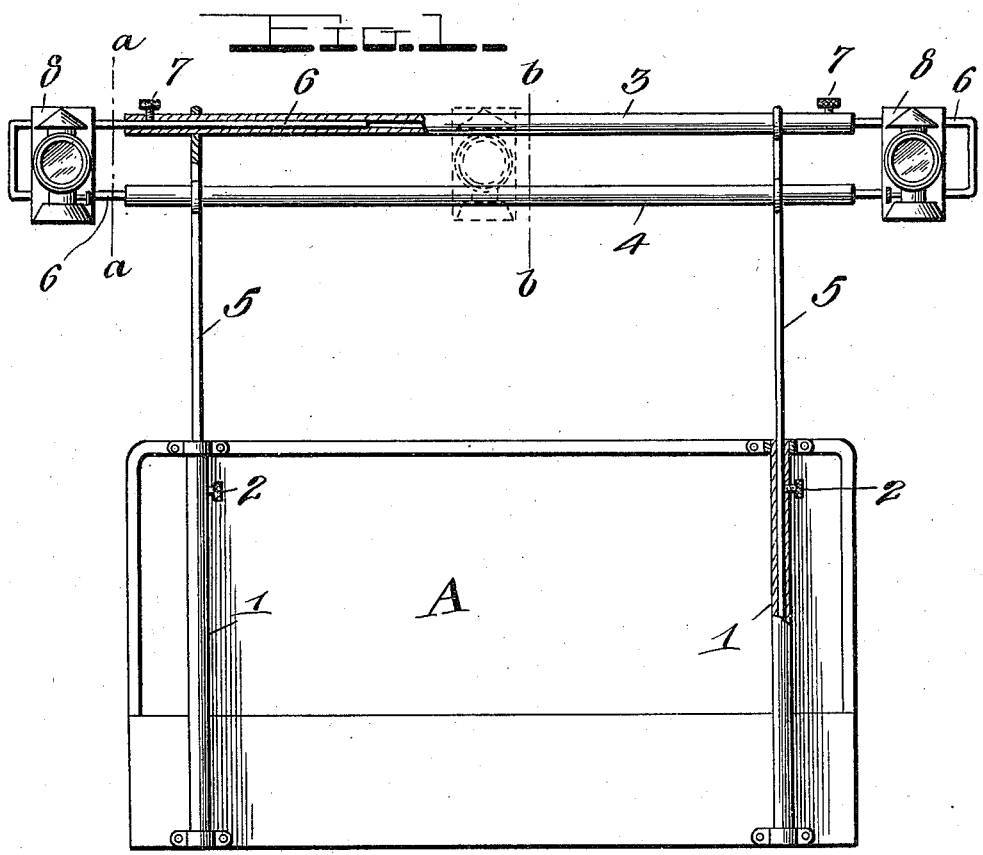
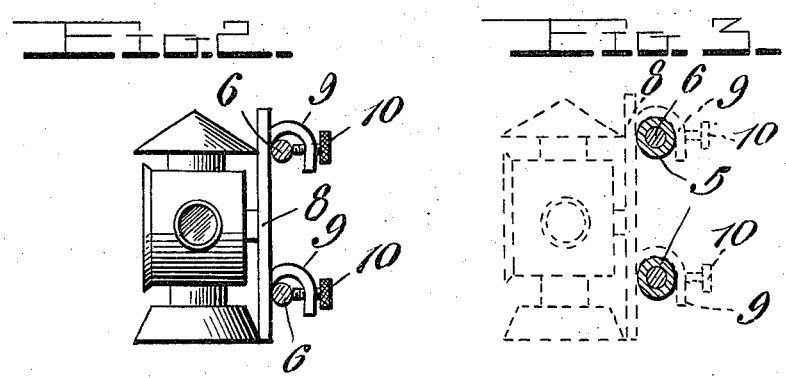
Witnesses
Chas. L. Griesbauer.
M. F. Peeser.
Inventor
H. J. Holmes,
By Watson E. Coleman.
Attorney
THE NORRIS PETERS CO., WASHINGTON, D. C.

UNITED STATES PATENT OFFICE.

HENRY J. HOLMES, OF CLARENCE, MICHIGAN.

LANTERN-HOLDER FOR VEHICLES.

984,563. Specification of Letters Patent. Patented Feb. 21, 1911.

Application filed November 23, 1910. Serial No. 593,929.

*To all whom it may concern:*

Be it known that I, HENRY J. HOLMES, a citizen of the United States, residing at Clarence, in the county of Calhoun and State of Michigan, have invented certain new and useful Improvements in Lantern-Holders for Vehicles, of which the following is a specification, reference being had to the accompanying drawings.

This invention is an improved device for holding a lantern or lamp and attaching the same to the dashboard of a buggy or other vehicle, and adjusting the lamp or lantern to any desired position, the invention consisting in the construction, combination and arrangement of devices hereinafter described and claimed.

In the accompanying drawings,—Figure 1 is a front elevation of a lantern holder constructed in accordance with my invention, showing the same attached to the dashboard of a vehicle. Figs. 2 and 3 are detail sectional views on planes indicated by the lines $a$—$a$, $b$—$b$ respectively.

In accordance with my invention, I provide a pair of tubular guides and supports 1, which are secured vertically to the dashboard A of a vehicle near the ends thereof. Each of these tubular supports is provided with a set screw 2. I also provide a pair of horizontally disposed spaced tubular bars 3, 4 which are connected together by vertical rods 5 which extend downwardly therefrom, and operate in the tubular holders 1, and enable the said tubular rods 3, 4 to be raised or lowered as may be required and secured at any desired vertical adjustment, the set screw 2 by engagement with the rods 5 securing the said rods and hence also the tubular bars 3, 4, in the required position.

In connection with the tubular bars 3, 4, I employ a pair of horizontally disposed U-shaped slides 6, the arms of which are movable longitudinally in the bores of the tubular bars 3, 4 so that the said slides may be extended from or moved into the said tubular bars as may be required according to the distance it is desired to support the lanterns or lamps beyond the ends of the dashboard. The said slides may be engaged at any desired adjustment by means of set screws 7, with which the upper tubular bar 3 is provided so that the slides may be securely held in any adjusted position. The lamps or lanterns indicated at 8, may be of any suitable form and construction, and per se, constitute no part of my invention.

Each lamp or lantern is provided with suitable attaching devices by means of which it may be secured to one of the slides or else directly secured to the tubular bars 3, 4. For the purposes of this specification, I show a lantern having a back plate 8 which is provided on its rear side with a pair of hooks 9, which may be engaged with the arms of one of the slides or else engaged with the tubular bars 3, 4 according to whether it is desired to support the lantern directly above the dash board, or beyond one end of the same, and each of the said hooks is provided with a set screw 10 for clamping it to the arm of the slide or to one of the tubular bars. Any other suitable means may be employed for securing the lantern to the slides or to the tubular bars.

While I have herein shown what I now regard as a preferred embodiment of my invention, I would have it understood that modifications in the form, proportion and construction of the various parts may be made within the scope of the appended claim.

I claim:—

The herein described lantern supporting device comprising vertical guides and supports, for attachment to a dashboard, and provided with clamping devices, upper and lower tubular bars, vertical rods connecting said tubular bars, and operating in said guides and supports, and U-shaped slides having their arms longitudinally adjustable in the said tubular bars, means to clamp the said slides in said tubular bars at any desired adjustment, and means to attach a lantern to said tubular bars or to said slides at will.

In testimony whereof I hereunto affix my signature in the presence of two witnesses.

HENRY J. HOLMES.

Witnesses:
JOHN A. WALLACE,
ERMA FAVORITE.